Figure 1:
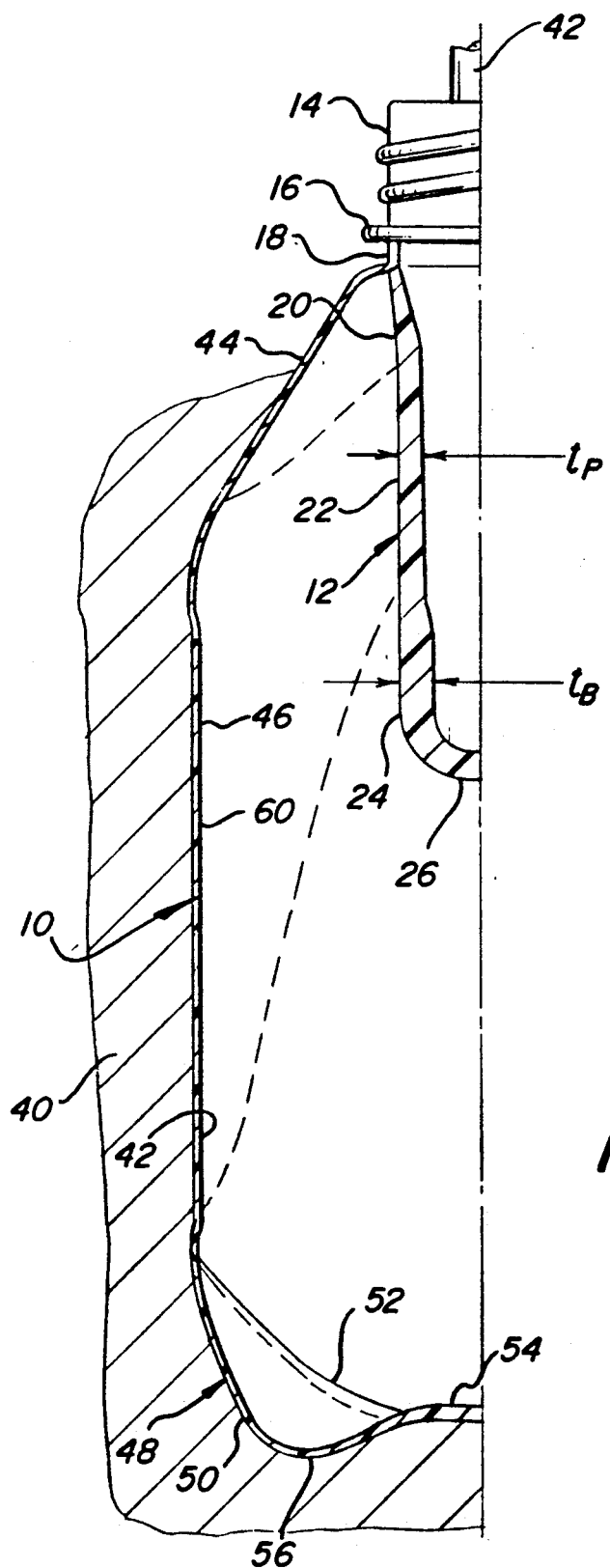

United States Patent [19]

Krishnakumar et al.

[11] Patent Number: 5,104,706
[45] Date of Patent: Apr. 14, 1992

[54] PREFORM FOR HOT FILL PRESSURE CONTAINER

[75] Inventors: Suppayan M. Krishnakumar, Nashua; Wayne N. Collette, Merrimack; Thomas E. Nahill, Amherst, all of N.H.

[73] Assignee: Continental PET Technologies, Inc., Florence, Ky.

[21] Appl. No.: 493,779

[22] Filed: Mar. 15, 1990

[51] Int. Cl.⁵ .................. B65D 1/02; B65D 23/00
[52] U.S. Cl. .................. 428/36.92; 215/1 C; 220/606; 428/542.8
[58] Field of Search .............. 428/36.92, 542.8; 215/1 C; 220/606

[56] References Cited

U.S. PATENT DOCUMENTS

| | | | |
|---|---|---|---|
| 3,137,748 | 6/1964 | Makowski | 215/1 C X |
| 4,406,854 | 9/1983 | Yoshino | 215/1 C X |
| 4,715,504 | 12/1987 | Chang et al. | 215/1 C |
| 4,755,404 | 7/1988 | Collette | 215/1 C X |
| 4,785,948 | 11/1988 | Strassheimer | 428/36.92 |
| 4,885,197 | 12/1989 | Strassheimer | 428/36.92 |
| 4,915,992 | 4/1990 | Takakusaki et al. | 215/1 C X |
| 4,927,679 | 5/1990 | Beck | 215/1 C X |
| 4,950,514 | 8/1990 | Strassheiher | 215/1 C X |

FOREIGN PATENT DOCUMENTS 1132465   9/1982   Canada .................. 215/1 C

*Primary Examiner*—James J. Seidleck
*Attorney, Agent, or Firm*—Charles E. Brown

[57] ABSTRACT

This relates to the packaging of a hot liquid product in a container having little resistance to internal vacuum wherein immediately after the container has been filled, the container is internally pressurized and closed. This particularly relates to an injection molded preform formed of a suitable polyester resin which is of a configuration related to an intended blow mold cavity whereby the desired biaxial orientation is obtained in the various portions of the resultant container and the wall thickness of the container base is increased so as to prevent undue stress enlargement and creep at high internal pressurization. Internal pressurization on the order of 40–45 psig is envisioned.

3 Claims, 2 Drawing Sheets

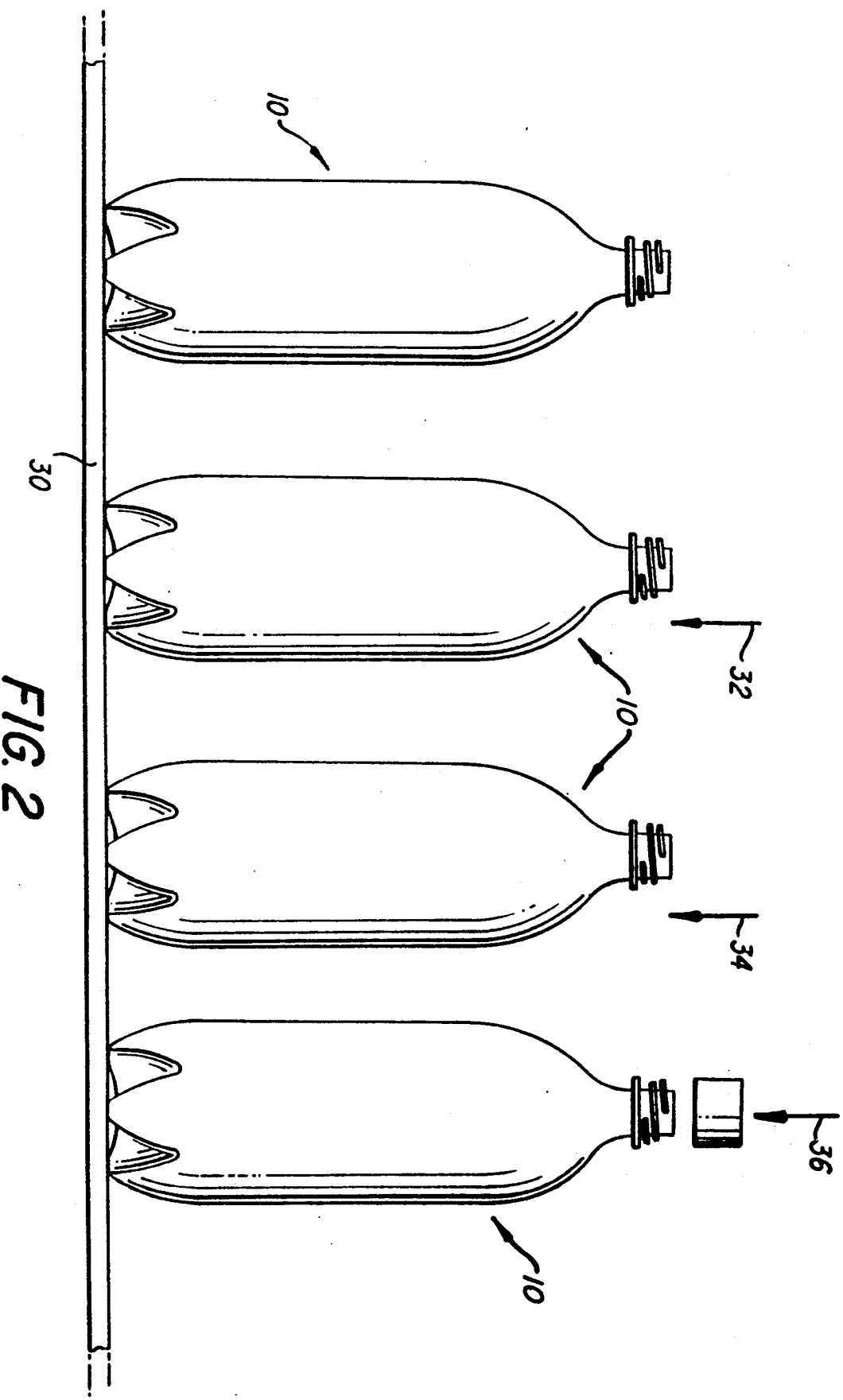

PREFORM FOR HOT FILL PRESSURE CONTAINER

This invention specifically relates to containers which are filled with a hot liquid product and thereafter internally pressurized to a limited degree so as to prevent a vacuum being formed within the container with a resultant container deformation. Most particularly, this invention relates to a modifi.de preform for forming such a required container wherein the base of the container is of greater thickness than usual and wherein the container base, when heated by the hot liquid product and subject to internal pressurization will have a minimum stress deformation and creep.

This invention particularly relates to an improvement over the invention specifically set forth in a commonly assigned co-pending application of Wayne N. Collette et al entitled "PET HOT FILL PRESSURE CONTAINER", U.S. application Ser. No. 306,395, filed Feb. 6, 1989 and now In U.S. Ser. No. 306,395, it is disclosed that a conventional stretch blow molded container formed of PET and like polyesters need not be specially heat treated and need not have reinforcing panels in order to to be commercially filled with a hot liquid product. This is accomplished by adding to the container immediately after filling with the hot liquid product liquid nitrogen followed by immediate closing of the container and wherein the liquid nitrogen becomes nitrogen gas and internally pressurizes the container to prevent a vacuum collapse thereof.

In accordance with the disclosure of U.S. Ser. No. 306,395, the initial pressure is on the order of 30 psig. This pressure, in most instances, is sufficient for maintaining the container internally pressurized when the hot liquid product fill cools to room temperature. However, the internal pressurization is very low.

It has been found that instead of the relatively low initial internal pressure of 30 psig, a more desirable initial internal pressurization would be on the order of 40-45 psig. However, known conventional containers intended for receiving liquids under high internal pressurization would have the bases thereof subject to too much stress and creep wherein a resultant head space would not be commercially acceptable. Accordingly, in accordance with this invention there is provided a new preform for forming a prior configuration container but wherein the base of such container is thicker and biaxially oriented.

With the above and other objects in view that will hereinafter appear, the nature of the invention will be more clearly understood by reference to the following detailed description, the appended claims, and the several views illustrated in the accompanying drawings.

FIG. 1 is a composite schematic vertical sectional view taken through a preform formed in accordance with this invention and shows how the preform is stretch blow molded to match the configuration of an existing mold cavity to form a satisfactory container in accordance with this invention.

FIG. 1 is a schematic elevational view showing the process of filling the container of FIG. 1 with a hot fill liquid product.

Reference is first made to FIG. 2 wherein there is illustrated containers 10 formed in accordance with this invention mounted on a conveyor 30. Each container 10, in sequence, is filled with a hot liquid product as indicated by the arrow 32, after which a small quantity of liquid nitrogen, indicated by the arrow 34, is placed within the container. The thus filled container 10 then has a conventional closure immediately applied thereto as indicated by the arrow 36. FIG. 2 corresponds to FIG. 5 of U.S. Ser. No. 306,395.

As pointed out above, the container 10 will not withstand being filled with a hot liquid product followed by internal pressurization and closing with the internal pressure being on the order of 40-45 psig in that the base of the container 10 will be unduly stressed and subject to creep which will result in an unacceptable increase in volume of the base and thus the volume of the container so as to result in an unacceptable head space when the internal pressurization is on the order of 40-45 psig.

At this time, it is pointed out that there have been recent developments relating to improved preforms which are stretch blow molded to form containers intended for high internal pressurization. such prior art preforms have been improved by thickening the base portion of the preform as compared to the thickness of the body portion of such preform. such containers are primarily intended to be refillable where during wishing in a caustic bath the bases are subject to stress cracking.

This invention particularly relates to an improved preform, generally identified by the numeral 12. The preform 12 is of an injection molded construction of PET and like polyester resins. The preform 12 is provided with a customary .neck finish 14 below which there is a customary capping flange 16.

Immediately below the capping flange 16, the preform 12 has a cylindrical portion 18 and thereafter increases in wall thickness in a shoulder forming portion 20. Below the shoulder forming portion is a body portion 22 of a substantially uniform wall thickness. Below the body portion 22 is a base forming portion 24 which terminates in a rounded generally hemispherical end 26.

The preform 12 is stretch blow molded in a conventional mold 40 of a split construction utilizing a stretch rod 42. The mold 40 has a cavity 42 of a configuration for forming the container 10.

It is to be understood that the proportions of the mold cavity 42 and those of the preform 12 are critical. It will be seen that the shoulder forming portion 20 is stretched both so as to be axially elongated and of an increased diameter to form a tapered shoulder 44 on the container 10. Next, it will be seen that the preform body portion 22 has a thickness $t_p$ and a length corresponding to an intended length of a container body 46. The specific wall thickness and length ratio between the preform body portion 22 and the container body 46 is one wherein the container body 46 is provided with a stretch ratio (thickness reduction) on the order of 9 to 12. The stretch ratio in the hoop direction is in the range of 3.2 to 3.7 while the stretch ratio in the axial direction is in the range of 2.8 to 3.2. The thus formed container body 46, being biaxially oriented, has a high resistance to internal pressurization of the container 10 while having very little resistance to radially inwardly collapse when there is a negative pressure or vacuum within the container 10.

Finally, the base forming portion 24 of the preform is stretched to form a base 48 of the container 10, which base corresponds to that shown in FIG. 2 and includes a plurality of legs 50 which are circumferentially spaced and which project from a generally hemispherical portion 52 having a recessed center 54 so that the container seats on feet 56 defined by the legs 50.

By increasing the wall thickness of the base portion 24 of the preform 12, the base 48 is of a greater thickness. Further, it will be seen that as the base portion 24 of the preform 12 is axially stretched, as well as being stretched in the hoop direction, the greater wall thickness gives a higher section modulus which lowers the applied stresses. The combination of thicker walls and increased orientation in the base 48 permits the desired higher initial internal pressurization of the container 10.

Further, in association with the improved container base construction, the shoulder 44 and the body 46 are formed with a moderately high degree of biaxial orientation with the orientation induced crystallinity in these portions of the container enhancing both the thermal stability and the resistance to creep deformation at elevated temperatures.

At this time, it is pointed out that the invention is not restricted to the specific base configuration, but may incorporate other available base configurations including those used in moderate pressure containers.

In addition, while the container body 46 has been broadly described, it is to be understood that the container body 46 may incluyde a panel section 60 with a slightly reduced diameter for receiving a label.

Although only a preferred embodiment of the preform and the container which is stretch blow molded therefrom have been specifically illustrated and described herein, it is to be understood that minOr variations may be made both in the preform configuration and the container configuration without departing from the spirit and scope of the invention as defined by the appended claims.

We claim:

1. A plastic preform for forming by strecth blow molding a commercially acceptable plastic container specifically intended for receiving a hot liquid product at atmospheric pressure followed by tempoary internal pressurization of said container as opposed to a similar plastic container intended for packaging of a liquid at a high internal pressure, said preform being of an injection molded construction and including a neck finish, a capping flange, a body portion for forming a container shoulder and body, and a bottom portion for forming a container base, said preform body portion for forming a container body being of a thickness and length for effecting a thickness reduction on the order of 9 to 12, and said preform bottom portion including a cylindrical extension of said preform body portion of an increased wall thickness as compared to the wall thickness of said preform body portion and terminating in a generally hemispherical axially outwardly projecting end of a reduced wall thickness as compared to said cylindrical extension.

2. A preform according to claim 1 wherein the intended stretch in the hoop direction is in the range of 3.2 to 3.7 and in the axial direction in the range of 2.8 to 3.2.

3. A container for an initial pressurized filling with a hot liquid formed from the preform of claim 1.

* * * * *

UNITED STATES PATENT AND TRADEMARK OFFICE
CERTIFICATE OF CORRECTION

PATENT NO.   : 5,104,706
DATED        : April 14, 1992
INVENTOR(S)  : S. Krishnakumar, et al.

It is certified that error appears in the above-indentified patent and that said Letters Patent is hereby corrected as shown below:

Col. 1, line 61 - delete "Fig. 1" and substitute -- Fig. 2 --.

Col. 2, line 23 - delete "wishing" and substitute -- washing --.

Col. 3, line 23 - delete "incluyde" and substitute -- include --.

Col. 3, line 28 - delete "minOr" and substitute -- minor --.

Signed and Sealed this

Ninth Day of November, 1993

Attest:

BRUCE LEHMAN

Attesting Officer

Commissioner of Patents and Trademarks